(12) United States Patent
Deland et al.

(10) Patent No.: US 7,114,788 B2
(45) Date of Patent: *Oct. 3, 2006

(54) ANGLED TRACTION LUGS FOR ENDLESS BAND

(75) Inventors: André Deland, Drummondville (CA); Marc Delisle, Drummondville (CA)

(73) Assignee: Soucy International Inc., Drummondville (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/440,155

(22) Filed: May 19, 2003

(65) Prior Publication Data

US 2004/0232766 A1 Nov. 25, 2004

(51) Int. Cl.
B62D 55/205 (2006.01)

(52) U.S. Cl. ............... 305/157; 305/160; 305/165; 305/173; 305/180

(58) Field of Classification Search ............ 305/160, 305/178, 165, 173, 174, 175, 176, 180, 157, 305/169, 195, 107, 111, 115, 128; 152/209 B; 474/152, 153
See application file for complete search history.

(56) References Cited

U.S. PATENT DOCUMENTS

| | | | | |
|---|---|---|---|---|
| 2,050,845 A | * | 8/1936 | Jett | 305/115 |
| 3,033,050 A | * | 5/1962 | Hisserich | 474/148 |
| 3,934,944 A | | 1/1976 | Forsgren | |
| 3,944,006 A | * | 3/1976 | Lassanske | 180/9.62 |
| 5,131,728 A | * | 7/1992 | Katoh et al. | 305/174 |
| 5,174,638 A | | 12/1992 | Tokue et al. | |
| 5,421,789 A | * | 6/1995 | Gregg | 474/153 |
| 5,813,733 A | * | 9/1998 | Hori et al. | 305/172 |
| 5,984,438 A | | 11/1999 | Tsunoda et al. | |
| 6,068,354 A | * | 5/2000 | Akiyama et al. | 305/160 |
| 6,139,121 A | | 10/2000 | Muramatsu | |
| 6,176,557 B1 | * | 1/2001 | Ono | 305/177 |
| 6,193,335 B1 | * | 2/2001 | Edwards | 305/167 |
| 6,530,626 B1 | * | 3/2003 | Benoit et al. | 305/157 |
| 6,672,983 B1 | * | 1/2004 | Mohr et al. | 474/152 |
| 6,733,091 B1 | * | 5/2004 | Deland et al. | 305/178 |

* cited by examiner

*Primary Examiner*—Frantz F. Jules
(74) *Attorney, Agent, or Firm*—Robert Brouillette

(57) ABSTRACT

This invention refers to the traction lugs of reinforced elastomeric endless traction bands, and more particularly to those which are used on heavy vehicles like defense vehicles or for skid steer vehicles. More specifically, the invention relates to traction lugs which are angled with respect to the transversal axis of the traction band and preferably disposed in chevrons, which optimize the band's traction while reducing the occurrences of teeth skipping and the level of vibrations and noise induced by the interaction of the traction band with the sprocket.

8 Claims, 5 Drawing Sheets

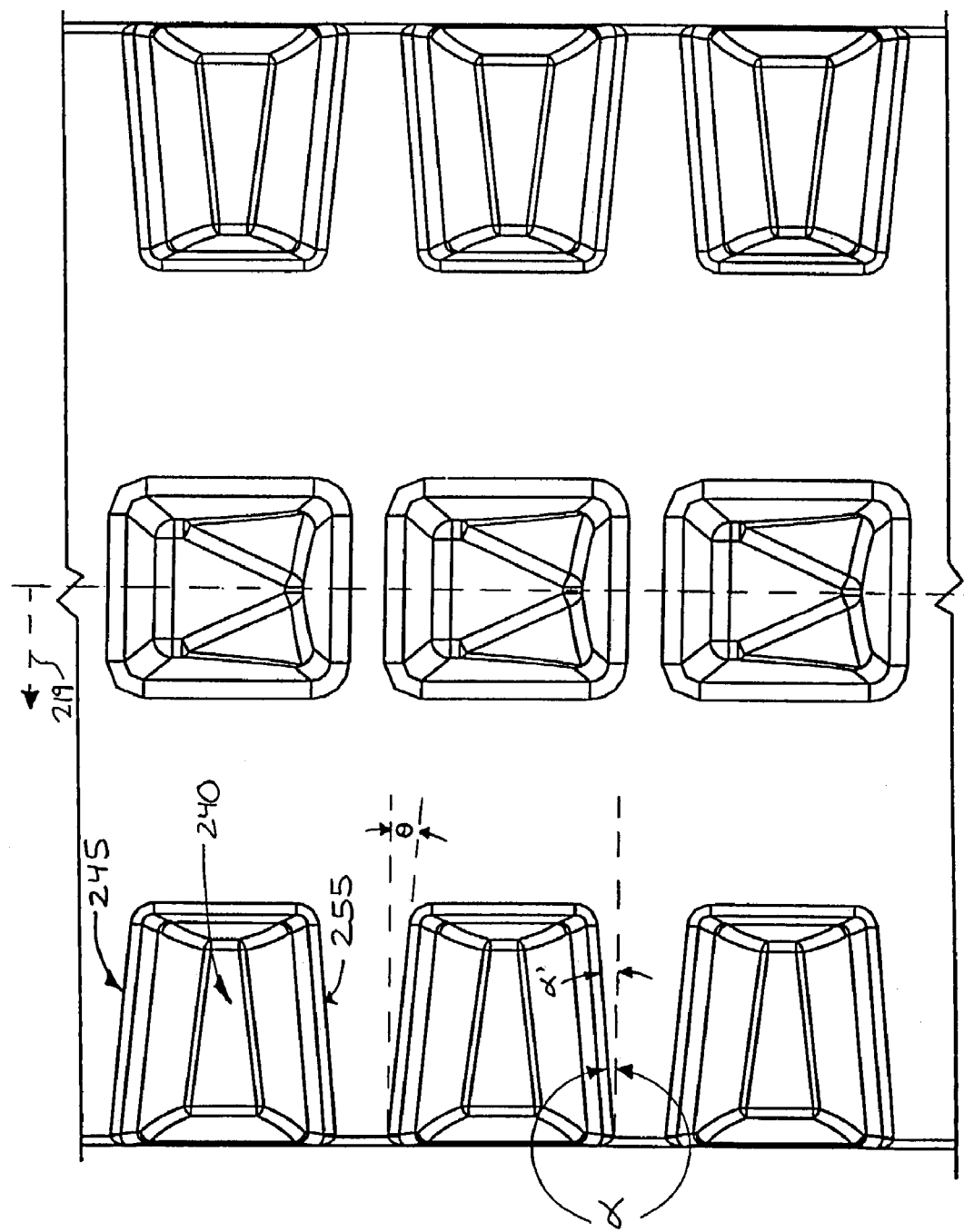

ANGLED TRACTION LUGS FOR ENDLESS BAND

FIELD OF INVENTION

This invention refers to the drive lugs of reinforced elastomeric endless traction bands, and more particularly to those which are used on heavy vehicles like defense vehicles. More specifically, the invention relates to traction lugs which are angled with respect to the transversal axis of the traction band.

BACKGROUND OF THE INVENTION

Heavy tracked vehicles and skid steer vehicles benefit from numerous advantages coming from the use of bands when traction is needed, when compared to the sole use of wheels. One of the most important advantages is the provision of a better traction on all types of soil: rocky, uneven, muddy or covered with snow, etc. When traction is ensured via the use of a band, a sprocket usually transmits mechanical power from the engine to the traction band, which in turns transmits this power to the ground to provide movement to the vehicle. Therefore, the traction band's efficiency greatly relies on the interaction between the sprocket and the band, and more particularly, on the meshing of the drive lugs with the sprocket.

For metallic tracks, this interaction is extremely solid since the sprocket engages in the band according to the chain drive principle. The meshing efficiency of the sprocket with metallic bands benefits from the high strength and rigidity of steel. However, metallic tracks have drawbacks (high overhaul costs, damages to the ground, weight, noise, etc.) which led to the development of the reinforced elastomeric traction band technology.

By minimizing these drawbacks, the use of elastomeric materials for traction bands generated other problems which particularly concern the meshing of the sprocket and the traction band. These problems include teeth skipping, detracking and they are, among other reasons, attributable to the high elasticity of elastomeric materials.

In order to diminish the occurrences of these problems, it is possible to rigidify the elastomeric material by thickening the drive lugs. However, this solution is limited by the increased interference occurrences when a thickened drive lug meshes with its corresponding sprocket cavity. When the meshing occurs, it must be understood that the traction lug of the band must necessarily have a shape which allows the transit of the lug from a linear motion to a circular motion, in order to obtain a maximal traction. In fact, the ideal meshing process would be obtained if there were no friction nor interference.

Similar principles were applied for the development of the elastomeric traction band designed for defense or skid steer vehicles. It has been found that a similar traction lug profile seems to offer a worthwhile solution to such vehicles, since in usual driving conditions (constant speed on a flat ground), the induced tension in the traction band allows the preservation of a firm contact between the traction lugs and the sprocket.

However, these ideal conditions are rarely encountered by such vehicles equipped with elastomeric traction bands, especially since they are often subject to frequent and brutal accelerations and decelerations, and because they very often ride on inclined and irregular terrains. Thus, those extreme operating conditions, generating large tangential forces transmitted to the traction lugs by the sprocket, sometimes cause the deformation (crushing or stretching) of the traction lugs meshed in the sprocket, therefore changing the actual distance between consecutives lugs (pitch variation). The bench test measurements and the numerical simulations we have done show that the pitch variations can go up to ¼ inch for a lug pitch of 3 to 5 inches. These pitch variations induce important interferences and friction forces between the lug-sprocket assembly which, when combined to a tension decrease in the traction band, are sufficient to generate radial forces which can initiate de-tracking occurrences and teeth skipping. In these conditions and for those instances, it is not possible to solve this problem by modifying the lug profile or thickening the traction lugs.

It was suggested in the prior art to use exterior lug profiles on elastomeric traction bands not perpendicularly oriented with respect to the longitudinal axis of the traction band. For instance, see U.S. Pat. No. 6,068,354 (Akiyama et al.) and U.S. Pat. No. 5,984,438 (Tsunoda et al.). However, no prior art uses or even suggests the utilization of traction band with traction lugs configured in a chevron pattern or otherwise not parallel to the longitudinal axis of the traction band.

SUMMARY OF THE INVENTION

The object of the present invention is to overcome or reduce the occurrences of the problems cited hereinabove, by combining a) the use of traction lugs are not perpendicular to the longitudinal axis of the traction band, preferably disposed in chevrons and b) by providing complementary sprocket lug receiving cavities. This particular solution allows:

1. To increase the effective thickness of the traction lug without adding more elastomeric material, and therefore limiting the level of deformation of the traction lugs.
2. To decrease the contact surface, and therefore decrease the repulsion forces between the sprocket and the traction lugs as they start meshing together.
3. To increase the contact surface, and therefore increase the cohesion forces between the sprocket and the traction lugs during the circular motion.
4. To spread over time the meshing process of the traction lugs with the sprocket, and therefore reducing the vibration and/or noise levels caused by the meshing process.

There is therefore provided a traction band for a vehicle made from an elastomeric material and comprising a longitudinal axis, an external surface for cooperation with a ground surface and an inner surface comprising a series of traction lugs for cooperation with a sprocket, said sprocket being coupled to said vehicle's power source, said traction lug having a front contact surface and a rear contact surface wherein at least one of said front contact surface and said rear surface has an angular orientation which is not perpendicular to said longitudinal axis.

There is also provided a traction band for a vehicle made from an elastomeric material and comprising a longitudinal axis, an external surface which cooperates with the ground surface and an inner surface comprising a series of traction lugs designed to cooperate with a sprocket, said sprocket being coupled to said vehicle's power source wherein said traction lugs are not perpendicular to said longitudinal axis.

There is furthermore provided a traction band for a vehicle made from an elastomeric material and comprising a longitudinal axis, an external surface for cooperation with a ground surface and an inner surface comprising a series of traction lugs for cooperation with a sprocket, said sprocket being coupled to said vehicle's power source, said traction lug having a front contact surface and a rear contact surface wherein said front contact surface and said rear surface have a different angular orientation with respect to said longitudinal axis.

Other aspects and many of the attendant advantages will be more readily appreciated as the same becomes better understood by reference to the following detailed description and considered in connection with the accompanying drawings in which like reference symbols designate like elements throughout the figures.

The features of the present invention which are believed to be novel are set forth with particularity in the appended claims.

BRIEF DESCRIPTION OF THE FIGURES

FIG. 5 is a partial top view showing another embodiment of the traction lugs in a chevron pattern on the traction band's internal surface.

DETAILED DESCRIPTION OF A PREFERRED EMBODIMENT

Figure 1:
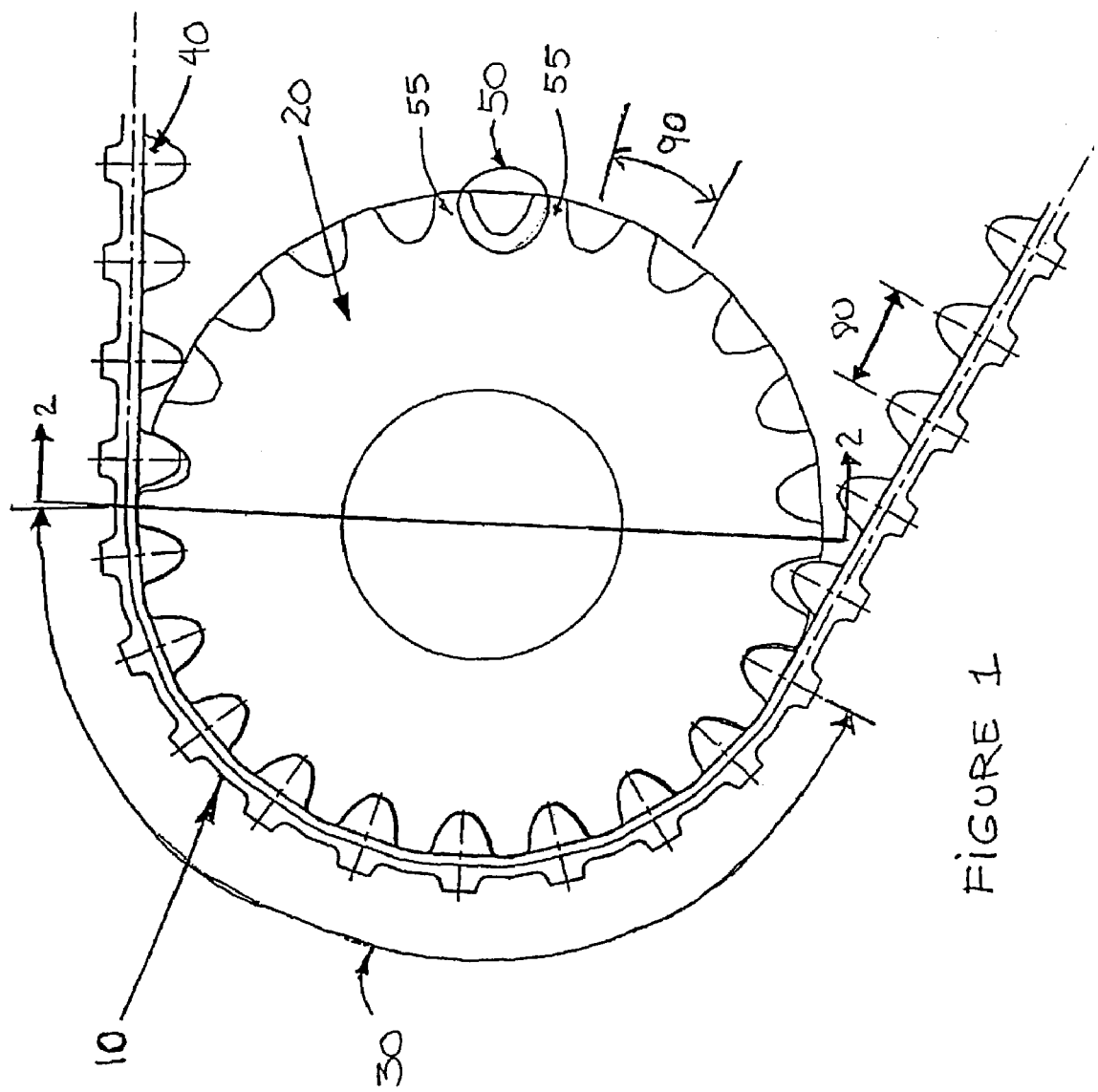
FIG. 1 is a general side view showing a traction band meshing with a sprocket in a typical mode of operation, at a constant speed and on a flat surface.

FIG. 1 shows a typical reinforced elastomeric traction band 10 made from UHMW-PE (or polymeric material of low friction coefficient and abrasion resistant) and mounted around a sprocket 20 on a vehicle. The traction band 10 under tension is in contact with the sprocket 20 along an arc or angular meshing range 30, which generally spans from 30 to 180 degrees, and linearly extends before and after the arc 30. As seen in FIG. 1, the sprocket 20 is a wheel with a succession of teeth 55 and cavities 50. It is rigidly coupled to a transmission shaft, principally to transmit power from the engine (not shown) to the traction band 10, which explains the importance of a firm cohesion or meshing between the traction lugs 40 of the traction band 10 and the corresponding cavities 50 of the sprocket 20. In this example, there are twenty-two cavities 50, and ten of them are meshed with their corresponding traction lugs 40 at any given time. Theoretically, only one meshed traction lug 40 can transmit power from the sprocket 20 to the traction band 10, provided it is strong enough, but to optimally operate a vehicle equipped with such a traction band 10, a minimum of 4 to 6 lugs are preferably meshed at the same time. The appropriate meshing is obtained when the traction band 10 follows the rotational motion of the sprocket 20, without any sliding or teeth (lug) skipping.

Figure 2:
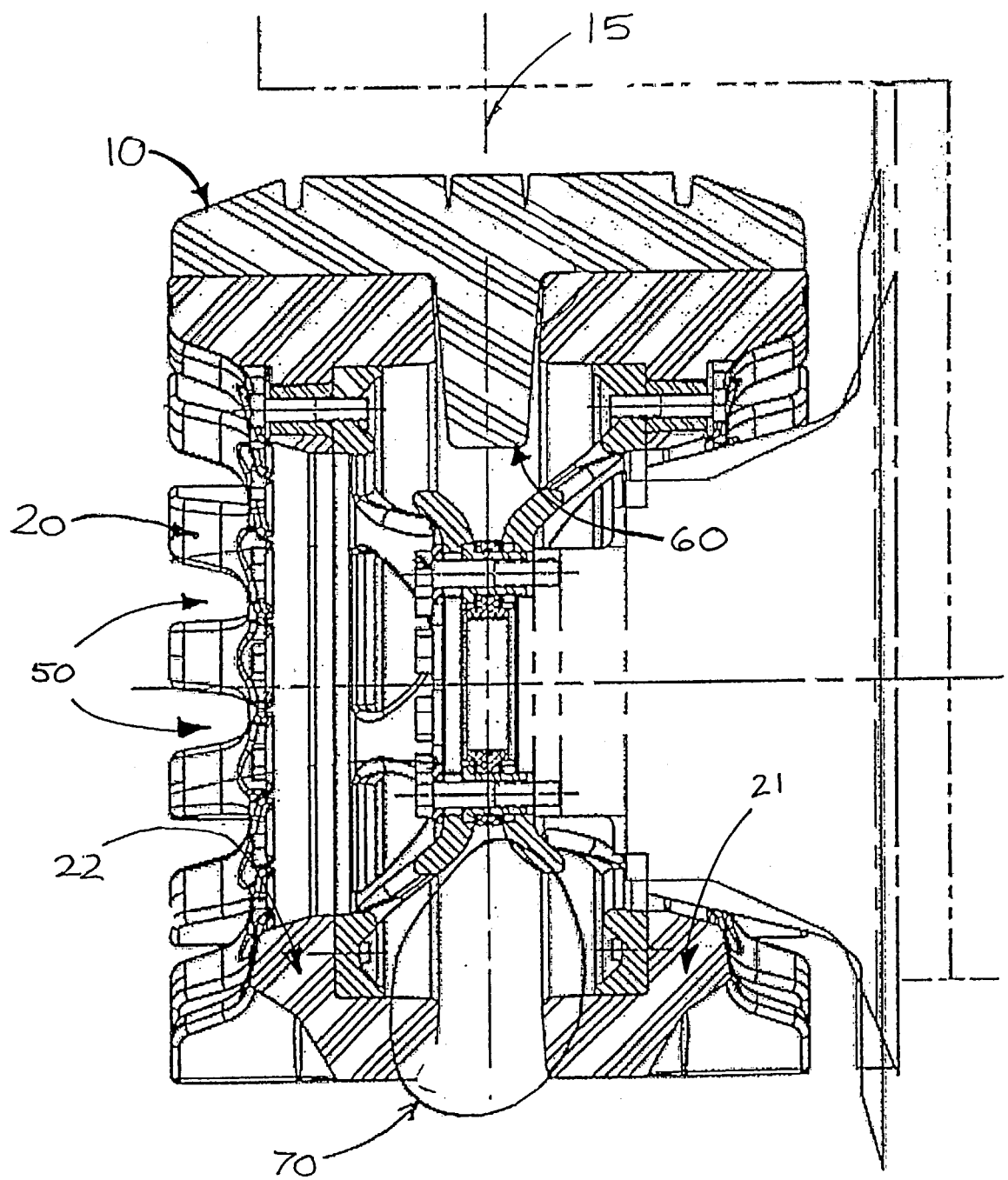
FIG. 2 is a partial section view taken along line 2—2 in FIG. 1 showing the traction band being guided by the guide lugs located between the traction lugs.

As shown in FIGS. 1 and 2, this appropriate meshing is achieved when a series of principal factors are all put together to limit the undesired lateral, tangential and normal displacements of the band 10 with respect to the sprocket 20. Those factors include the following:

1. The undesired lateral displacements of the traction band 10 with respect to the sprocket 20 are prevented by the guidance provided by guide lugs 60 being maintained in a throat cavity 70 which is defined in between the two symmetrical halves 21,22 of the sprocket 20 and located on each side of a symmetrical plan 15 of the traction band 10. However, the width of the throat 70 is somewhat larger than the width of the guide lugs 60.

2. The normal (teeth skipping) and tangential (sliding) displacements of the band 10 with respect to the sprocket 20 significantly decrease with the meshing of the traction lugs 40 of the band 10 in the corresponding cavities 50 of the sprocket 20. The quality of this meshing depends by itself on multiple factors including:

i) First, the tension of the traction band 10 must be high enough such that the normal component of the resulting tension force compensates for the radial component force of the contact forces between the cavities 50 and the traction lugs 40;

ii) Secondly, these contact forces intimately depend on the materials composing the surfaces where the contact happens.

iii) Thirdly, the quality of those contact surfaces (their composition as much as their forms) depends on the elastic deformation and the wear of the traction lugs 40 and the cavities 50.

iv) Lastly, the lateral, tangential and normal displacements depend on the angular meshing range 30 and the number of traction lugs 40 meshed in their corresponding cavities 50. Those two parameters are not totally independent from one another, since they are linked by the band pitch 80 and the sprocket pitch 90.

The meshing efficiency between the traction band 10 and the sprocket 20 therefore considerably depends on the chosen materials, the traction lug's design and the sprocket's design. We believe that our invention provides much improved meshing efficiency compared to prior art designs.

Figure 3:
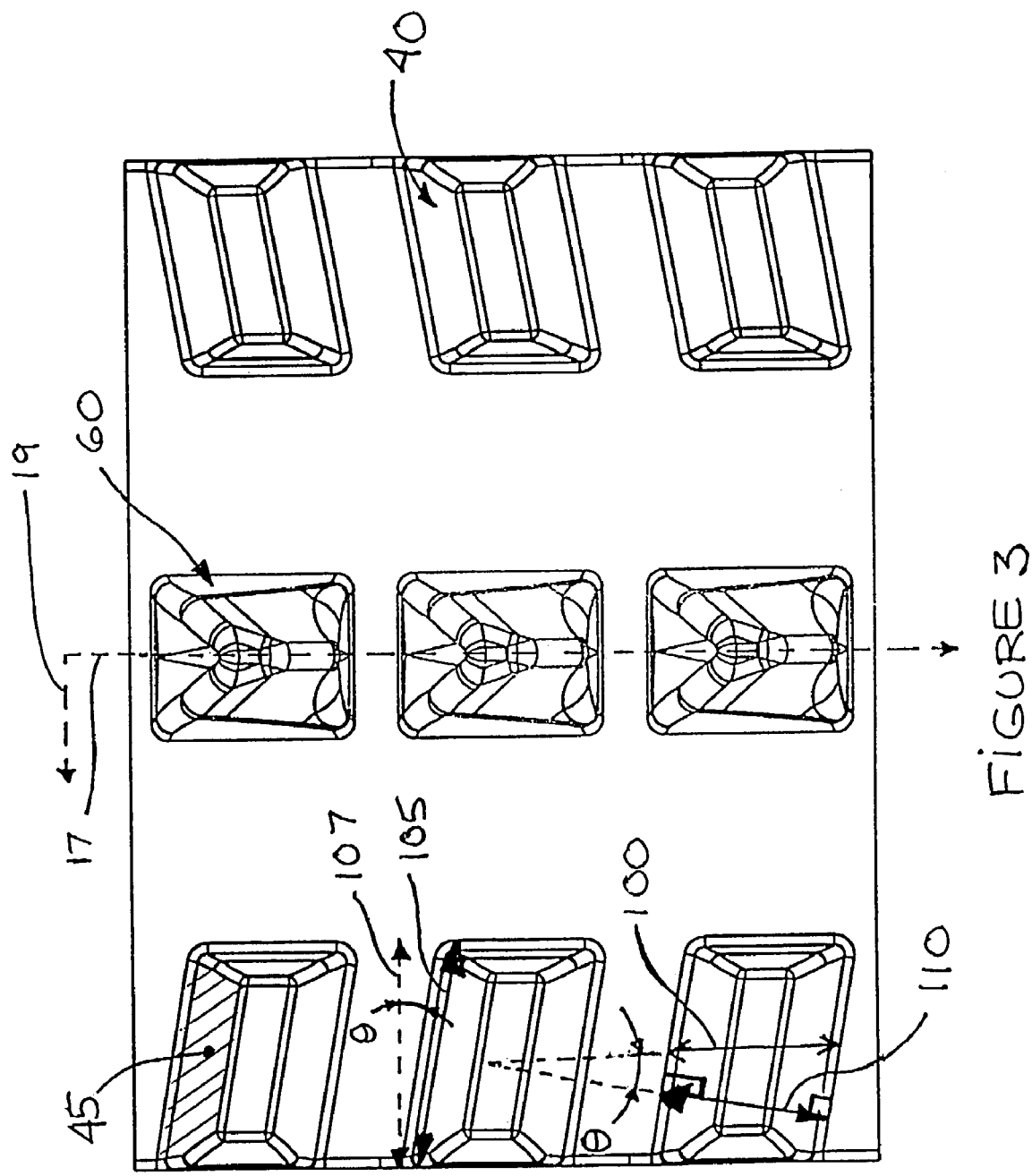
FIG. 3 is a partial top view showing the periodical structure of the traction lugs in a chevron pattern on the traction band's internal surface.
Figure 4:
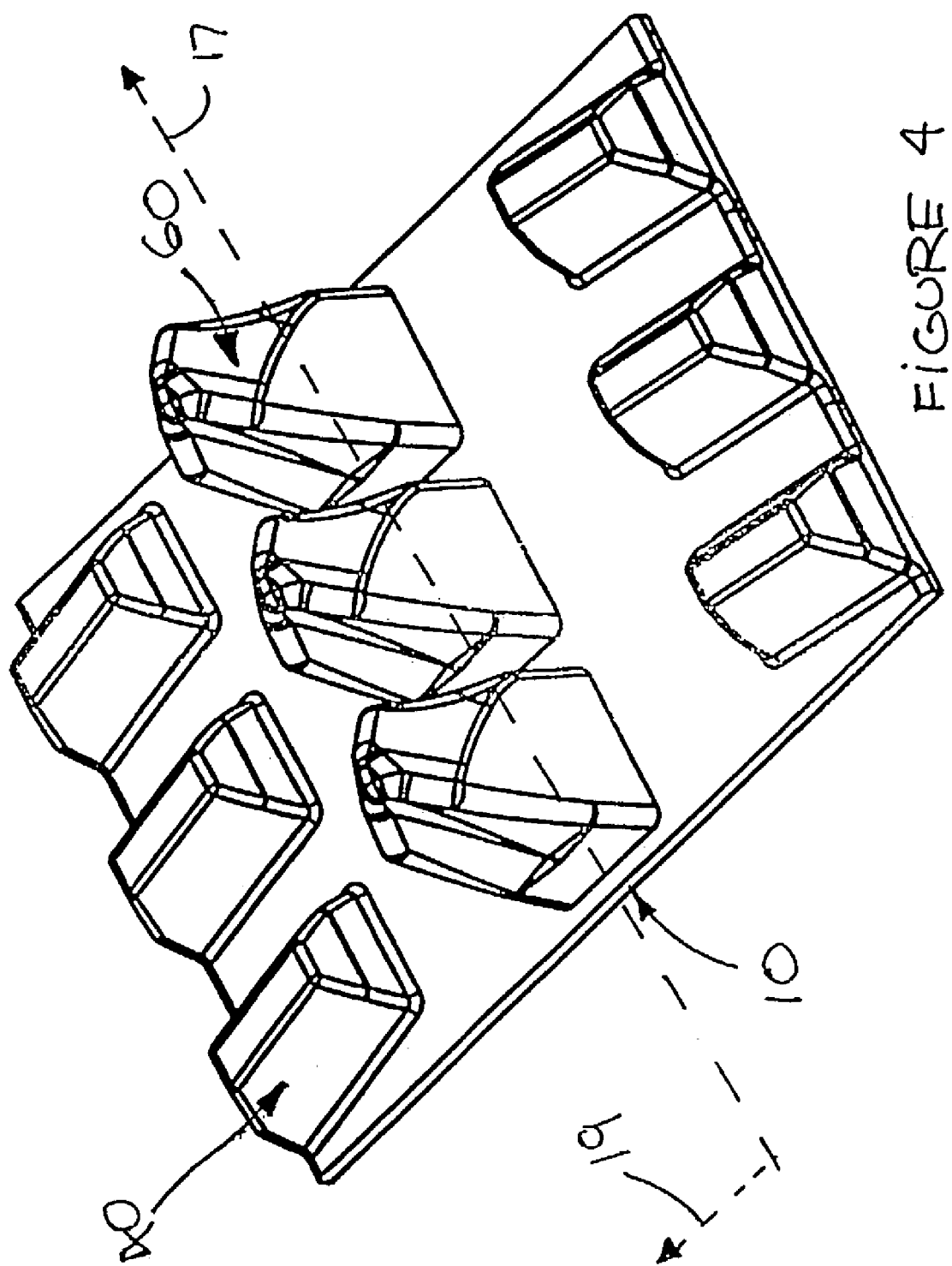
FIG. 4 is a partial isometric view showing the periodical structure of the traction lugs in a chevron pattern on the traction band's internal surface.

FIGS. 3 and 4 show how the traction lugs 40 are symmetrically disposed in a chevron pattern on each side of the longitudinal axis 17 of the traction band 10. The traction lugs 40 and the guide lugs 60 are repeated along the circumference of traction band 10 and form a periodical and cyclic structure. The symmetrical disposition of the traction lugs 40 allows the equilibrium of the transversal contact forces with the sprocket 20.

It is shown in FIGS. 3 and 4 that angle θ, representing the angularity of the traction lug 40 with respect to the transversal axis 19 of the traction band 10. In this embodiment, the angular value is about 10 degrees. Angle θ also represents the angle between the effective thickness $E_{eff}$ 100 of each traction lug 40, which is measured along the longitudinal axis 17, and the perpendicular thickness $E_{per}$ 110 which is the thickness of the traction lug 40 measured normal to the contact surface 45.

The ratio of the thickness gives:

$$E_{eff}/E_{per}=1/\cos\theta\ (0°<=\theta<90°)$$

As θ increases, the ratio increases. Actually, by orienting the traction lugs 40 with respect to the transversal axis 19, $E_{eff}$ 100 becomes larger then $E_{per}$ 110. The traction lug's rigidity with respect to the longitudinal forces is therefore superior to a prior art traction lug located perpendicularly to the longitudinal axis of the traction band (θ=0).

The total effective length $L_{eff}$ 105 of the traction lug 40 is also increased by the same factor, such that the contact surface 45 between the traction lug 40 and the sprocket 20 is larger than the prior art lug's transversal length $L_{trans}$ 107.

Since the traction lugs 40 are angled, and not perpendicular, with respect to the transversal axis 19 of the traction band 10, they engage and start meshing gradually in the cavities 50 of the sprocket 20. The cavities 50 must also present a complementary mating shape to the traction lugs 40 to allow a progressive meshing with the angled traction lug 40.

In a prior art traction lug ($\theta=0$), the meshing process between the traction lugs and the sprocket is done simultaneously on the whole contact surface. When each angled lugs 40 starts meshing with its corresponding cavity 50, the meshing of the contact surface 45 between the traction lugs 40 and the sprocket 50 is progressively generated, such the normal component of the contact forces is diminished and the teeth skipping phenomenon are significantly reduced.

After each angled traction lug 40 is fully meshed in its corresponding cavity 50, the increased contact surface 45 coming from a larger $L_{eff}$ 105 usually ensures a better traction with increased cohesion forces between the sprocket and the traction lugs during the circular motion.

Since the meshing process of the traction lugs 40 in a chevron pattern with the sprocket 20 is gradually done over time and in a smoother way than the prior art's traction band, the vibration and noise levels are also significantly reduced in the traction band 10 in operation.

In another embodiment illustrated in FIG. 5, the contact or front surface 245 of the traction lugs 240 in a chevron pattern has an angular orientation $\theta$ with respect to the transversal axis 219 which is different than the angular orientation $\alpha$ of its rear surface 255 with the same transversal axis 219.

This embodiment offers an indirect advantage to the manufacturing of the sprocket 20. Indeed, each cavity 50 of the sprocket 20 has a shape configuration which generally corresponds to the shape configuration of the traction lugs 240 to allow the meshing of the traction lugs 240 with the sprocket 20.

The shape configuration of the sprocket's cavities 50 is partly driven by the front 245 and rear 255 contact surfaces of the traction lugs 240. In this embodiment, the contact surfaces 245,255 laterally taper toward each other to form a wedge type shape. A wedge type shape can be generated from at least one of the contact surfaces 245,255 tapering toward the other, regardless of their angular orientation $\theta$ and $\alpha'$ ($\alpha'$ is the complementary angle of $\alpha$).

When molding a part like a sprocket, parts are introduced an then removed to create holes, cavities, recesses or taps. Wedge shaped parts are usually more easily removed from a molded part than parts with parallel sides.

Therefore, the angled drive lugs 240 can ease the manufacturing process of the sprocket 20, in addition to ensuring an appropriate meshing by minimizing the undesired lateral, tangential and normal displacements of the band 10 with respect to the sprocket 20.

Although preferred embodiments of the invention has been described in detail herein and illustrated in the accompanying figures, it is to be understood that the invention is not limited to this precise embodiment and that various changes and modifications may be effected therein without departing from the scope or spirit of the present invention.

The invention claimed is:

1. A traction band for a vehicle made from an elastomerit material and comprising a longitudinal, axis, an external surface for cooperation with a ground surface and an inner surface comprising a series of fraction lugs for cooperation with a sprocket, said sprocket being coupled to said vehicle's power source, said traction lugs having a laterally extending front contact surface and a laterally extending rear contact surface wherein said front contact surface and said rear surface have a different lateral angular orientation with respect to said longitudinal axis.

2. A fraction band as claimed in claim 1, wherein said angular orientation of said front contact surface and said angular orientation of said rear contact surface have said front and said rear contact surface taper toward each other.

3. A fraction band as claimed in claim 2, wherein said front and said rear contact surface taper toward said longitudinal axis.

4. A fraction band as claimed in claim 1, wherein said angular orientation of said front contact surface or said angular orientation of said rear contact surface have said front or said rear contact surface taper toward the other.

5. A fraction band as claimed in claim 4, wherein said front or said rear contact surface tapers toward said longitudinal axis.

6. A traction band as claimed in claim 1, wherein said fraction lugs are located in two groups, each said group being located on each side of said longitudinal axis.

7. A fraction band as claim in claim 6, wherein said fraction lugs are disposed in a chevron pattern.

8. A fraction band as claim in claim 7, wherein said traction bags in each said group are equidistant from one another.

* * * * *